(12) United States Patent
Fujita et al.

(10) Patent No.: US 9,682,642 B2
(45) Date of Patent: Jun. 20, 2017

(54) SEAT SUSPENSION

(71) Applicant: DELTA TOOLING CO., LTD., Hiroshima-shi (JP)

(72) Inventors: Etsunori Fujita, Higashihiroshima (JP); Hiroki Oshimo, Higashihiroshima (JP)

(73) Assignee: DELTA TOOLING CO., LTD., Hiroshima-shi (JP)

( * ) Notice: Subject to any disclaimer, the term of this patent is extended or adjusted under 35 U.S.C. 154(b) by 0 days.

(21) Appl. No.: 14/786,893

(22) PCT Filed: Apr. 22, 2014

(86) PCT No.: PCT/JP2014/061340
§ 371 (c)(1),
(2) Date: Oct. 23, 2015

(87) PCT Pub. No.: WO2014/175291
PCT Pub. Date: Oct. 30, 2014

(65) Prior Publication Data
US 2016/0082870 A1    Mar. 24, 2016

(30) Foreign Application Priority Data
Apr. 25, 2013    (JP) .................................. 2013-093121

(51) Int. Cl.
*B60N 2/16*    (2006.01)
*B60N 2/54*    (2006.01)
(Continued)

(52) U.S. Cl.
CPC ............... *B60N 2/54* (2013.01); *B60N 2/501* (2013.01); *B60N 2/502* (2013.01); *B60N 2/506* (2013.01);
(Continued)

(58) Field of Classification Search
USPC .................... 296/65.01, 65.02; 248/157, 421
See application file for complete search history.

(56) References Cited

U.S. PATENT DOCUMENTS 3,917,209 A * 11/1975 Adams .................. B60N 2/502
    248/421
4,382,573 A * 5/1983 Aondetto ............... B60N 2/072
    248/419

(Continued)

FOREIGN PATENT DOCUMENTS

EP    1 030 076 A1    8/2000
JP    10-203221 A    8/1998
(Continued)

OTHER PUBLICATIONS

International Search Report issued on Jul. 22, 2014 for PCT/JP2014/061340 filed on Apr. 22, 2014.

*Primary Examiner* — Alfred Wujciak
(74) *Attorney, Agent, or Firm* — Oblon, McClelland, Maier & Neustadt, L.L.P.

(57) ABSTRACT

A seat suspension with a compact structure while being capable of coping with input vibrations not only in a vertical direction but in six-axis directions. Three pantograph links between a vehicle body floor side and a seat side are employed. Thus, control in six-axis directions is possible, allowing simplification compared to conventional structures. In addition to an active control mechanism using the pantograph links, the seat suspension has a compressed coil spring and the magnetic spring as a first elastic member and a second elastic member. Specifically, damping is performed with high efficiency by controlling the seat side in a reverse phase to the vehicle body floor side with respect to the input direction of vibrations by the active control mechanism and meanwhile performing damping passively by these elastic members.

6 Claims, 10 Drawing Sheets

(51) Int. Cl.
 *B60N 2/50* (2006.01)
 *B60N 2/52* (2006.01)
(52) U.S. Cl.
 CPC ............ *B60N 2/522* (2013.01); *B60N 2/544* (2013.01); *B60N 2/162* (2013.01); *B60N 2/1615* (2013.01)

(56) References Cited

U.S. PATENT DOCUMENTS

| | | | | |
|---|---|---|---|---|
| 5,004,206 | A * | 4/1991 | Anderson | B60N 2/501 248/585 |
| 5,222,709 | A * | 6/1993 | Culley, Jr. | B60N 2/502 248/421 |
| 5,388,801 | A * | 2/1995 | Edrich | B60N 2/502 248/421 |
| 5,735,509 | A * | 4/1998 | Gryp | B60N 2/501 248/550 |
| 6,059,253 | A | 5/2000 | Koutsky et al. | |
| 6,336,627 | B1 | 1/2002 | Fujita et al. | |
| 7,413,158 | B1 * | 8/2008 | Burer | B60N 2/42736 248/421 |
| 8,585,004 | B1 * | 11/2013 | Roeglin | F16M 11/18 248/421 |
| 2002/0017749 | A1 | 2/2002 | Fujita et al. | |
| 2006/0261647 | A1 | 11/2006 | Maas et al. | |
| 2013/0206949 | A1 * | 8/2013 | Archambault | B60N 2/508 248/421 |
| 2015/0232004 | A1 * | 8/2015 | Haller | B60N 2/501 248/562 |

FOREIGN PATENT DOCUMENTS

| | | |
|---|---|---|
| JP | 2000-234649 A | 8/2000 |
| JP | 2002-021922 A | 1/2002 |
| JP | 2002-67770 A | 3/2002 |
| JP | 2003-320884 A | 11/2003 |
| JP | 2005-199939 A | 7/2005 |
| JP | 2006-509673 A | 3/2006 |
| JP | 2010-179719 A | 8/2010 |

* cited by examiner

Fig. 10

SEAT SUSPENSION

TECHNICAL FIELD

The present invention relates to a seat suspension supporting a seat for a vehicle such as an automobile.

BACKGROUND ART

In Japanese Patent Applications Nos. 2003-320884 and 2005-199939, a seat suspension as follows is disclosed. Specifically, an upper frame provided to be vertically movable with respect to a lower frame attached to a vehicle body floor is supported elastically with a magnetic spring and a torsion bar. Utilizing that the magnetic spring has a negative spring constant in a predetermined displacement range, by combining with the torsion bar having a positive spring constant, a spring constant resulted from superposing both the springs in the predetermined displacement range becomes substantially zero, making a structure such that even when a friction force of a link or the like is included therein, the spring constant (stationary spring constant) of the entire seat suspension (entire system) is kept in the vicinity of the above-described substantially zero, so as to absorb vibrations. Further, Japanese Patent Application No. 2010-179719 has proposed a technology to elastically support a fixed magnet unit constituting the magnet spring on an upper frame side or a lower frame side, so as to further improve vibration damping performance.

On the other hand, Japanese Patent Application No. H10-203221 discloses a seat suspension in which six hydraulic cylinders are disposed to actively control a seat in six-axis directions.

PRIOR ART DOCUMENT

Patent Document

Patent Document 1: Japanese Patent Application Laid-open No. 2003-320884
Patent Document 2: Japanese Patent Application Laid-open No. 2005-199939
Patent Document 3: Japanese Patent Application Laid-open No. 2010-179719
Patent Document 4: Japanese Patent Application Laid-open No. H10-203221

DISCLOSURE OF THE INVENTION

Problems to be Solved by the Invention

The seat suspensions disclosed in Patent Documents 1 to 3, with respect to vibrations with a predetermined frequency and amplitude, absorb vibrations by relative movements of the upper frame and the lower frame with the above-described structure using the magnetic spring and the torsion bar, but both of them are merely to respond to vertical vibrations and forward-backward vibrations inputted via the vehicle body floor from a road surface. The seat suspension disclosed in Patent Document 4 can absorb vibrations in six-axis directions, but has a complicated structure since it has to use six hydraulic cylinders. Further, since the six hydraulic cylinders are controlled individually, six hydraulic control systems are necessary, and it is difficult to incorporate these mechanisms in a limited space between the vehicle body and the vehicle seat. Further, the seat suspension disclosed in Patent Document 4 basically performs active control with all the six hydraulic cylinders and hence needs strict control with high response, and a control program for them inevitably becomes complicated.

The present invention has been made in view of the above-described problems, and it is an object thereof to provide a seat suspension with a compact structure suitable for incorporating in a vehicle while being capable of coping with input vibrations not only in a vertical direction but in six-axis directions.

Means for Solving the Problems

In order to solve the above-described problems, a seat suspension of the present invention is a seat suspension interposed between a vehicle body floor and a seat, wherein the seat suspension includes a first elastic member having a positive spring constant to bias the seat side in a direction to depart from the vehicle body floor side and a second elastic member with a negative spring constant functioning in a predetermined displacement range, the first and second elastic members being structured to form a dead zone where superposed spring constants of the first and second elastic members become substantially zero in the predetermined displacement range, and to damp input vibrations by operation of the dead zone, and the seat suspension has an active control mechanism including three disposed pantograph links and controlling the pantograph links corresponding to input vibrations from the vehicle body floor, and displacing the seat side in six-axis directions.

Preferably, the second elastic member is a magnetic spring having a negative spring constant functioning in a predetermined displacement range. Preferably, it is structured such that the pantograph links are provided with an elastic member having a negative spring constant functioning in a predetermined displacement range. Preferably, the first elastic member is a compressed coil spring biasing the seat side in a direction to depart from the vehicle body floor side.

Preferably, the seat suspension further includes a damper, wherein in a displacement region higher than an equilibrium point in the pantograph links, the seat suspension is controlled to increase a damping force of the damper by using a spring force of the first elastic member, and wherein in a displacement region lower than the equilibrium point in the pantograph links, the seat suspension is set to cancel a Coulomb friction force generated in a system by control of the active control mechanism and a damping force of the damper so that a feeling of springiness becomes relatively high.

Further, preferably, the three pantograph links are disposed at equal intervals in a circumferential direction in plan view.

Effect of the Invention

According to the present invention, the seat suspension is structured to include a first elastic member having a positive spring constant and a second elastic member in which a negative spring constant functions, in which a dead zone where superposed spring constants of the first and second elastic members is substantially zero in a predetermined displacement range is formed, and a seat side relatively operates in a reverse phase to input vibrations by operation of this dead zone, thereby damping the vibrations. Further, the seat suspension also has an active control mechanism including three disposed pantograph links. Thus, by controlling the pantograph links according to input vibrations, the seat side can be displaced in six-axis directions, and a Coulomb friction force generated in the system of the seat suspension can be reduced corresponding to the input direction of vibrations. Accordingly, a passive vibration damping function by the first and second elastic members operates efficiently, and a high vibration absorption characteristic can be exhibited in the entirety including the active control mechanism.

BRIEF DESCRIPTION OF DRAWINGS

FIGS. 7(a), (b) are views illustrating an example of a structure when a tensile coil spring is provided on a pantograph link used in the seat suspension of the embodiment.

FIGS. 9(a), (b) are views illustrating another example of a structure when tensile coil springs are provided on the pantograph link.

EMBODIMENT FOR CARRYING OUT THE INVENTION

Hereinafter, the present invention will be described in further detail based on an embodiment illustrated in drawings. FIG. 1 to FIG. 4 are views illustrating a seat suspension 1 and a seat 500 supported on the seat suspension 1 according to one embodiment of the present invention. In this embodiment, the seat 500 including sliders 510 is supported on an upper support frame 600, and a "seat side" includes the seat 500, the sliders 510 and the upper support frame 600, and a "vehicle body floor side" includes a lower support frame 700 disposed on a vehicle body floor. Note that the "seat side" refers to the seat 500 itself disposed on an upper side of the seat suspension 1, or refers to all members including the seat 500 and related parts, such as the sliders 510 supporting the seat 500, and the like. For example, in a structure in which a cushion frame is supported directly on the upper support frame 600, the "seat side" includes the upper support frame 600 and the seat 500 and does not include the sliders 510. The "vehicle body floor side" may be the vehicle body floor itself, or when sliders are disposed on the vehicle body floor and the lower support frame 700 is supported on the sliders, the "vehicle body floor side" may include the sliders.

Figure 5:
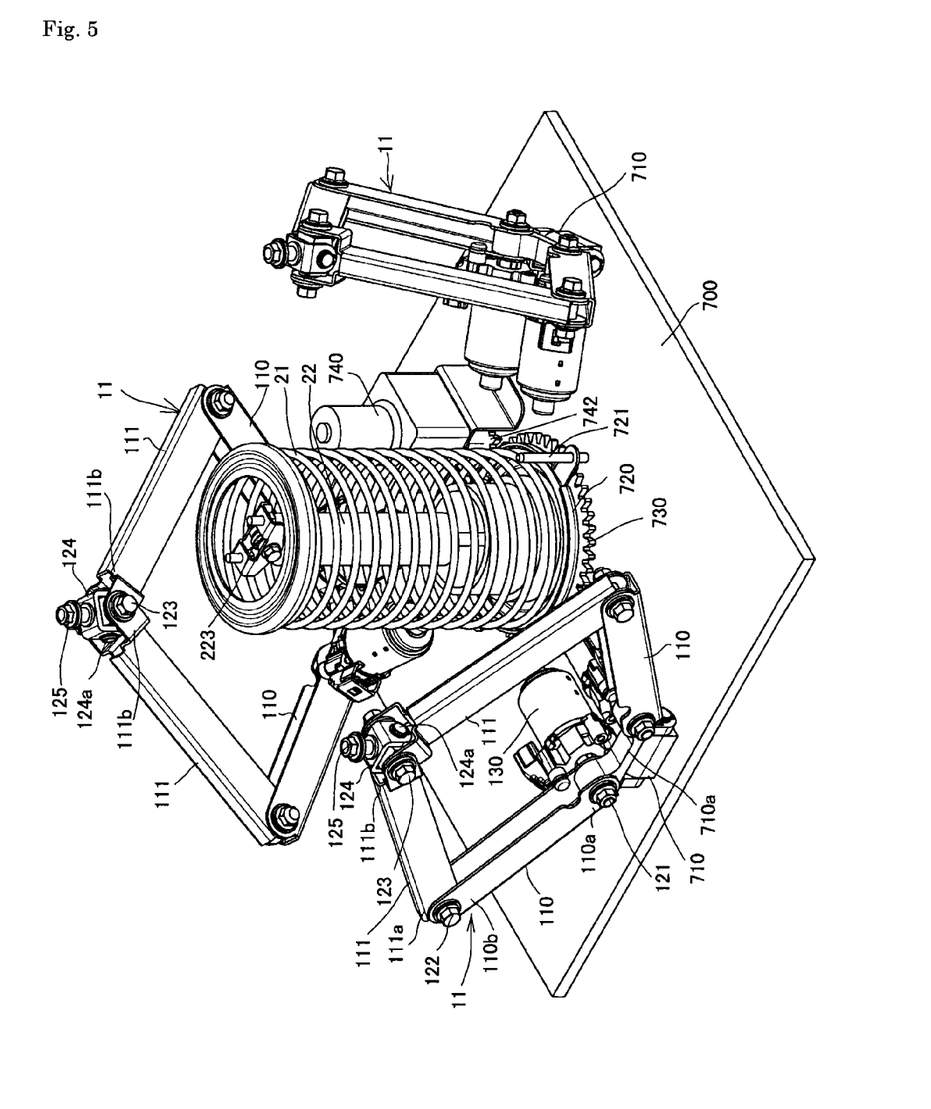
FIG. 5 is an exploded perspective view of the seat suspension of the embodiment.

The seat suspension 1 is structured to have an active control mechanism 10, a first elastic member (compressed coil spring 21) and a second elastic member (magnetic spring 22) which damp vibrations passively. The active control mechanism 10 includes three pantograph links 11. The three pantograph links 11 are disposed at equal intervals in a circumferential direction, that is, at 120-degree intervals in the circumferential direction in plan view (see FIG. 5).

On the lower support frame 700, three lower attachment bodies 710 having a predetermined width are provided at equal intervals in a circumferential direction, that is, at 120-degree intervals in the circumferential direction in plan view. The pantograph links 11 have first arms 110 and second arms 111 on the left and the right, and when facing the first arms 110 and the second arms 111, the left arms substantially form the shape of a less-than sign, and the right arms substantially form the shape of a greater-than sign. A lower attachment body 710 pivotally supports a lower support body 710a which pivots forward and backward relative to the lower attachment body 710. On this lower support body 710a, base end portions 110a, 110a of two left and right first arms 110, 110 are pivotally supported via shaft members 121, 121 in a posture to open wider toward opposite end portions 110b, 110b. On the opposite end portions 110b, 110b of the first arms 110, 110, base end portions 111a, 111a of the second arms 111, 111 are pivotally supported via shaft members 122, 122, where opposite end portions 111b, 111b of the second arms 111, 111 are pivotally supported in a posture to be directed to get close to each other.

Specifically, the opposite end portions 111b, 111b of the second arms 111, 111 are formed in a U shape, plate portions in this U shape are overlapped with each other, and a shaft member 123 is provided to penetrate them. Therefore, the opposite end portions 111b, 111b of the two left and right second arms 111, 111 are provided coaxially on the shaft member 123. The shaft member 123 is supported with a U-shaped frame member 124 orthogonal to an axial direction thereof, and is supported on the upper support frame 600 via a shaft member 125. The shaft member 125 is pivotally supported rotatably in a horizontal direction on the upper support frame 600. Further, the U-shaped frame member 124 is supported on a shaft member 124a orthogonal to the shaft member 123, and is pivotal about the shaft member 124a (pivotal in the same direction as a pivoting direction of the lower support body 710a). Thus, the pantograph links 11 are movable in six-axis directions, and capable of supporting the upper support frame 600 horizontally with respect to input vibrations.

In this embodiment, drive shafts of drive parts 130, 130 serve also as the shaft members 121, 121 on which the base end portions 110a, 110a of the first arms 110, 110 are pivotally supported. Thus, accompanying rotation of the shaft members 121, 121, the first arms 110, 110 rotate in one of directions. Note that the type of the motor constituting the drive parts 130, 130 is not limited, and besides a DC motor, a servo motor or the like can also be used.

Figure 1:
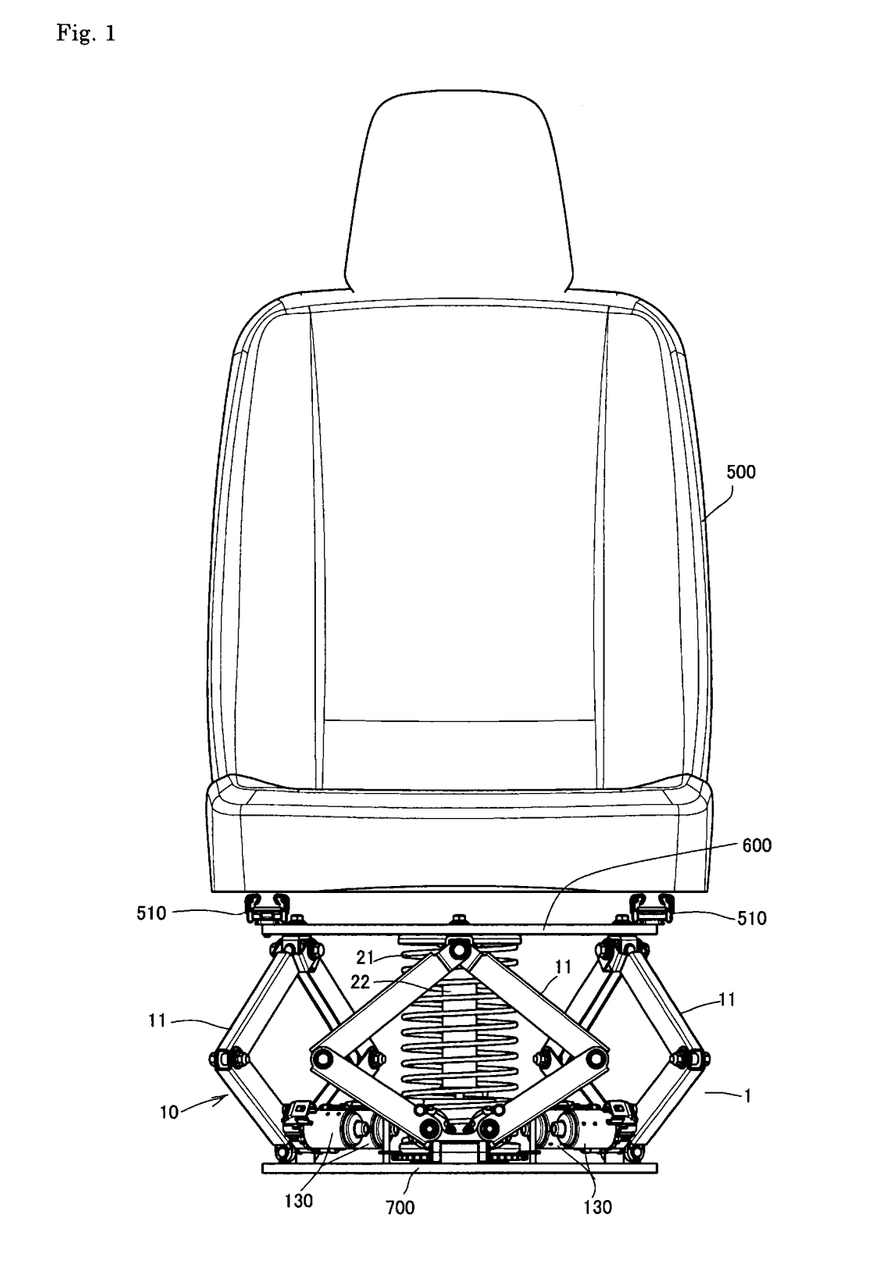
FIG. 1 is a front view illustrating a seat suspension and a seat supported on the seat suspension according to one embodiment of the present invention.
Figure 2:
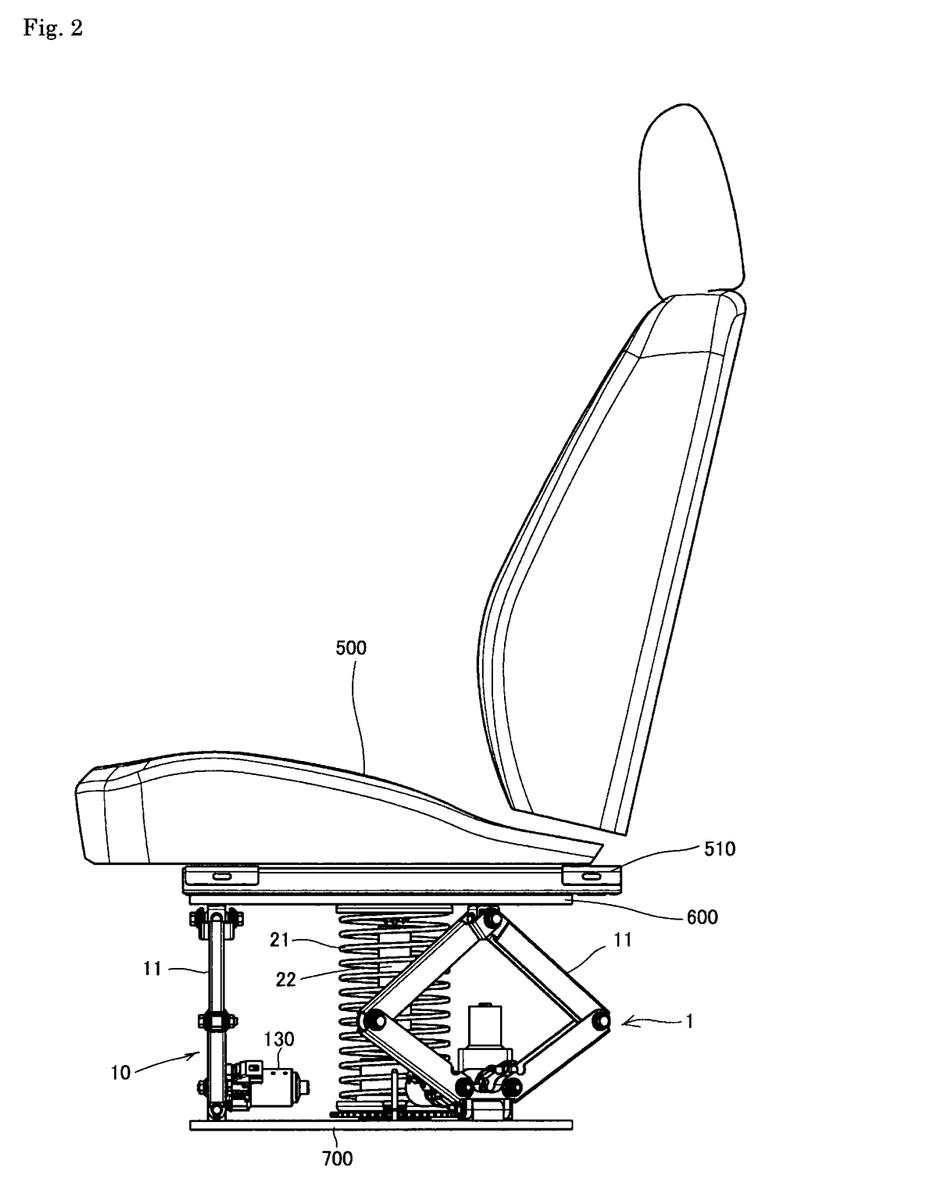
FIG. 2 is a side view of FIG. 1.
Figure 3:
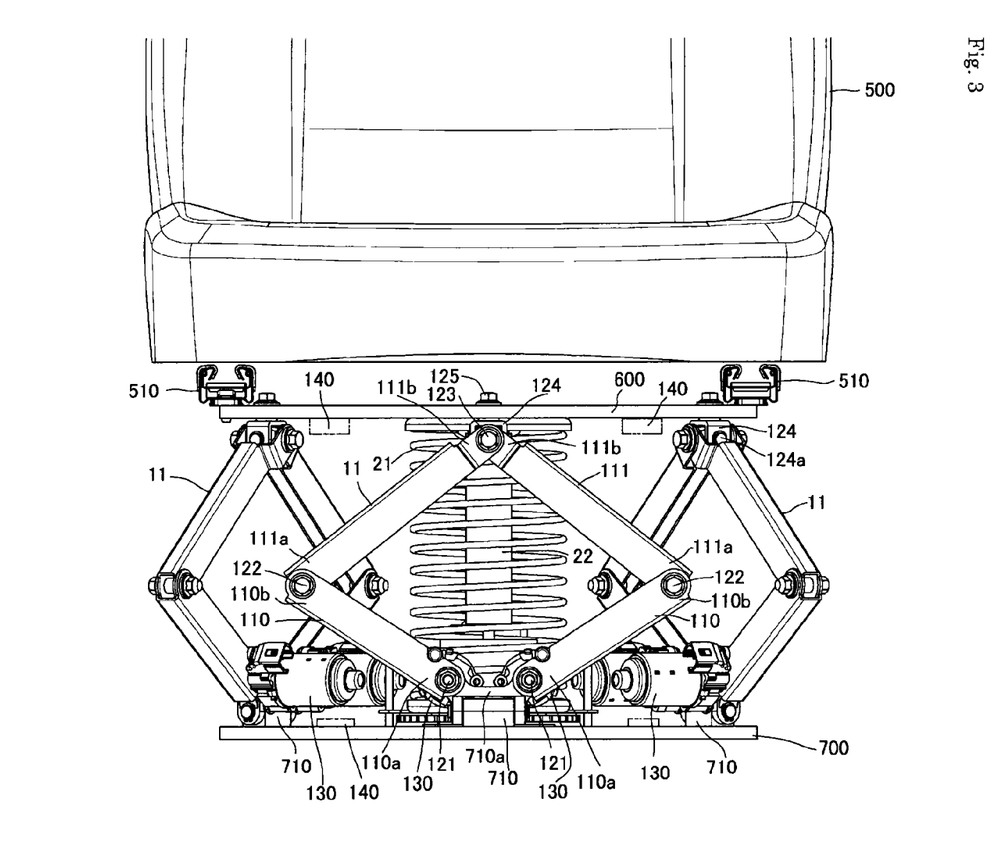
FIG. 3 is an enlarged view of the seat suspension illustrated in FIG. 1.
Figure 4:
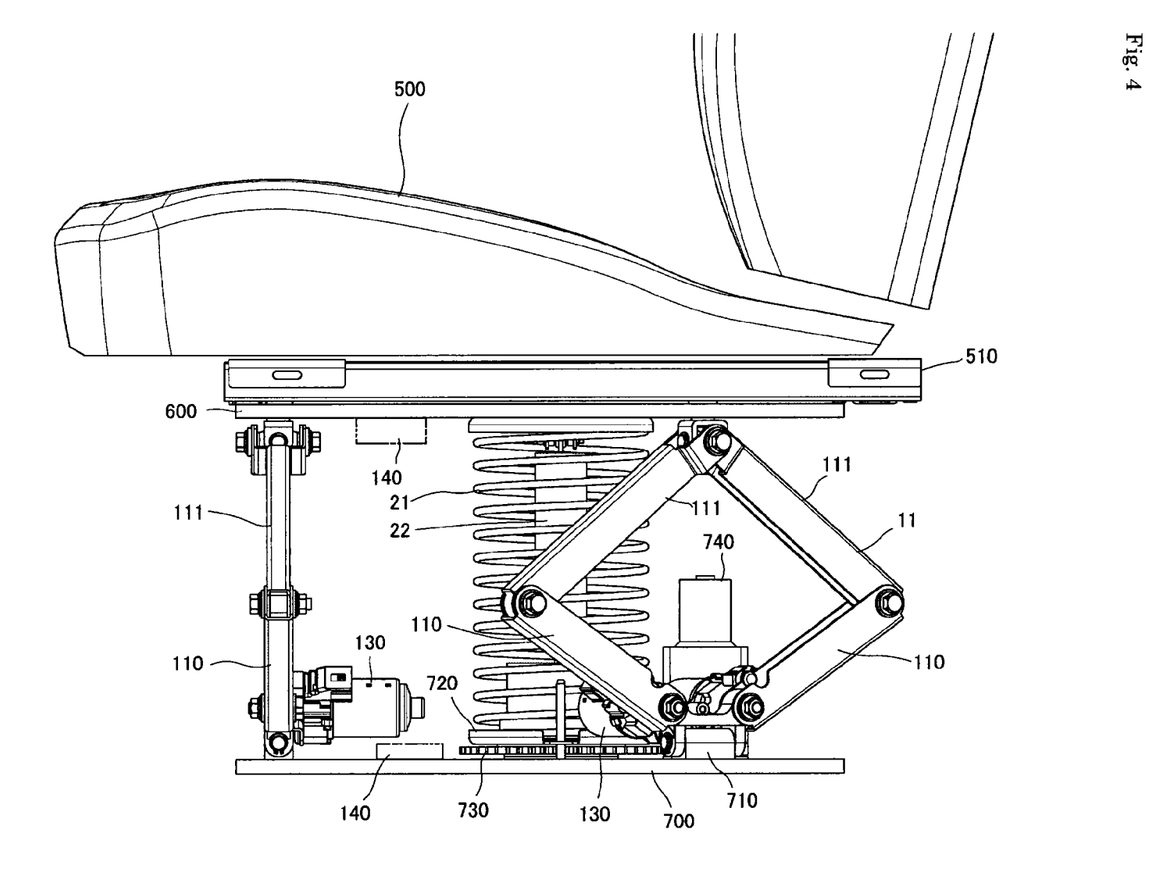
FIG. 4 is an enlarged view of the seat suspension illustrated in FIG. 2.

On at least one of the upper support frame 600 included in the seat side and the lower support frame 700 included in the vehicle body floor side, sensors 140 detecting a relative displacement accompanying input vibrations are provided, for example, as indicated with imaginary lines of FIG. 3 and FIG. 4. The sensors 140 may be provided only on one of the upper support frame 600 included in the seat side and the lower support frame 700 included in the vehicle body floor side, or may be provided on both of them, as long as they are capable of detecting relative displacements of the both. An appropriate type can be used as the type of the sensors 140, and an appropriate combination of a gyro sensor, an acceleration sensor, a position sensor, and/or the like can also be used. In any case, feedback signals corresponding to detection information of the sensors 140 are supplied to the drive parts 130 through a control unit (not illustrated), or the like, thereby causing the drive shafts and the shaft members 121, 121 coupled thereto to rotate in one of the directions, and the first arms 110, 110 in which the shaft members 121, 121 are engaged with the base end portions to make a rotating movement in one of the directions about the shaft members 121, 121.

The first and second elastic members which operate passively with respect to input vibrations are disposed between the upper support frame 600 included in the seat side and the lower support frame 700 included in the vehicle body floor side. The first elastic member may be any one as long as it has a positive spring constant to constantly bias the upper support frame 600 in a direction to separate from the lower support frame 700. In this embodiment, the compressed coil spring 21 is used as illustrated in the views, but it may also be a metallic spring, such as a torsion bar. Further, it may be a structure appropriately combining them.

Here, in this embodiment, the compressed coil spring 21 is disposed in a center position of the three pantograph links 11 with each other. Further, a lower end of the compressed coil spring 21 is disposed on a spring receiving plate 720 vertically movable along a guide pin 721 on the lower support frame 700. On a lower side of the spring receiving plate 720, a position adjustment gear 730 cooperating with the spring receiving plate 720 is disposed. This position adjustment gear 730 meshes with a drive gear 742 coupled to an output shaft 741 of a motor 740, and driving of the motor 740 rotates the drive gear 742 to rotate the position adjustment gear 730, thereby moving the spring receiving plate 720 vertically along the guide pin 721 (see FIG. 5, FIG. 6(a)). By adjusting the height of the spring receiving plate 720, the height of the upper support frame 600 supported via the compressed coil spring 21 can be adjusted, and an initial position adjustment corresponding to the weight of a seated person can be performed.

The second elastic member is constituted of the magnetic spring 22 with a negative spring constant functioning in a predetermined displacement range. Thus, a spring constant superposed by the compressed coil spring 21 having a positive spring constant and the magnetic spring 22 having a negative spring constant is low and substantially zero, thereby forming a dead zone. Accordingly, the seat side moves in a relatively reverse phase with respect to vibrations inputted from the vehicle body floor side, thereby preventing transmission of input vibrations.

Figure 6:
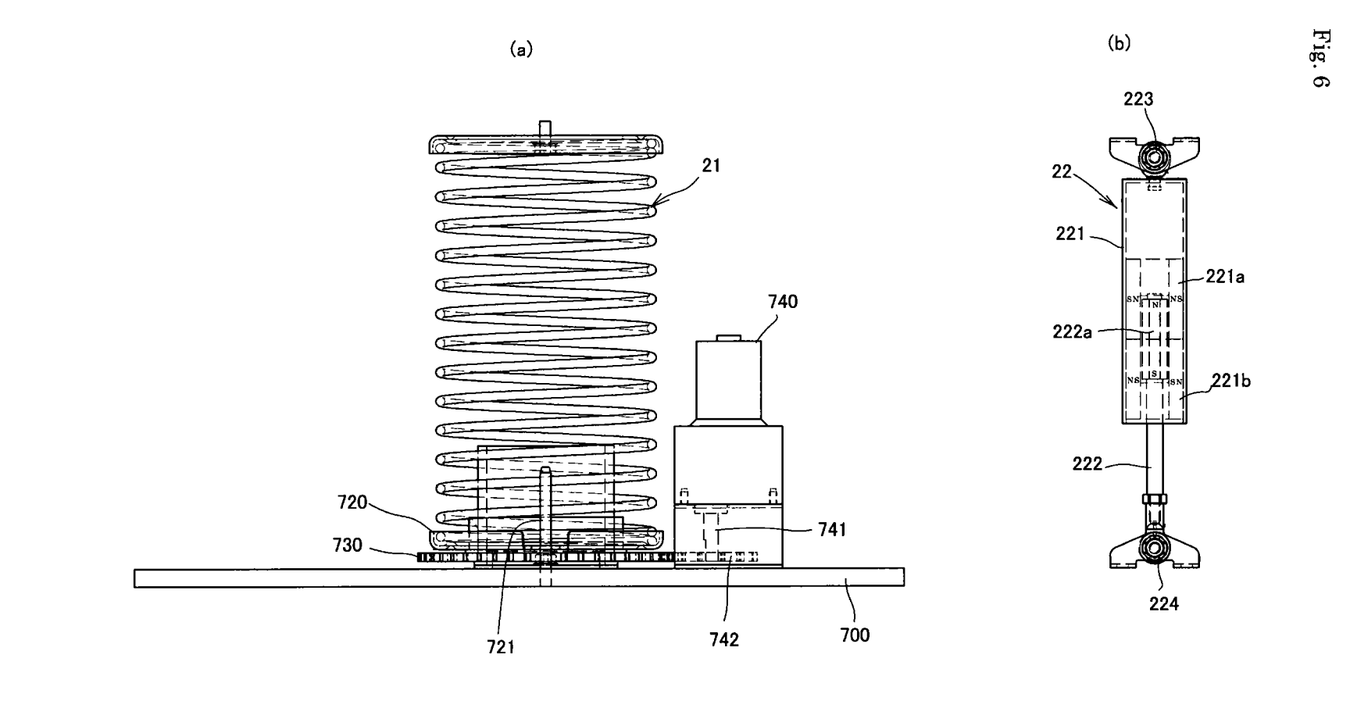
FIG. 6(a) is a view for explaining a structure of a compressed coil spring used in the seat suspension of the embodiment.
FIG. 6(b) is a view for explaining a structure of a magnetic spring.

The magnetic spring 22 is, although the structure and the disposing method thereof are not limited as long as having the above-described function, structured in this embodiment, as illustrated in FIG. 6(b), to have a cylinder 221 and a piston 222 capable of reciprocating relative to the cylinder 221. Inside the cylinder 221, cylindrical fixed magnets 221a, 221b magnetized in a radial direction are disposed so that different poles are adjacent to each other, and a movable magnet 222a provided on a tip of the piston 222 and magnetized in an axial direction is relatively displaced inside hollow portions of the fixed magnets 221a, 221b of the cylinder. Thus, a negative spring constant is exhibited by which a load mass decreases relative to a displacement amount in a predetermined displacement range.

In this embodiment, in the vicinity of the center of the hollow portion of the compressed coil spring 21, the cylinder and the piston are disposed in postures such that the cylinder 221 is on the side of the upper support frame 600, and a rod part of the piston 222 is on the side of the lower support frame 700 (see FIG. 1 to FIG. 5). An upper side joint member (spherical bearing in this embodiment) 223 is attached to an end face of the cylinder 221, and this joint member 223 is coupled to the upper support frame 600. A lower side joint member (spherical bearing in this embodiment) 224 is attached to an end portion of the rod part of the piston 222, and this joint member 224 is coupled to the lower support frame 700.

Next, operations of the seat suspension 1 according to this embodiment will be described. Given that the positions illustrated in FIG. 1 to FIG. 4 are near an equilibrium point in the seated state of a person, in the magnetic spring 22 as the second elastic member the movable magnet 222a is located in the range where the negative spring constant functions with respect to the fixed magnets 221a, 221b of the cylinder 221.

In this state, when the lower support frame 700 being the vehicle body floor side vertically vibrates by irregularities of a road surface or the like, due to the positive spring constant of the compressed coil spring 21 and the negative spring constant of the magnetic spring 22, the seat suspension functions not to transmit to the upper support frame 600 but to block the vibrations of the lower support frame 700 by the operation of the dead zone where the spring constant is substantially zero as described above.

When vibrations inputted to the lower support frame 700 are not only in the vertical direction but in the forward and backward direction and the leftward and rightward direction (vehicle width direction) as well as directions to rotate about the vertical, forward and backward, and leftward and rightward axes (yaw direction, roll direction, pitch direction), the three pantograph links 11 of the active control mechanism 10 operate so that the posture of the seat 500 is in a reverse direction to the vibration direction thereof. Specifically, a relative posture of the upper support frame 600 to the lower support frame 700 is detected by the sensors 140, and feedback signals thereof are transmitted to the respective drive parts 130 of the three pantograph links 11 via the control unit (not illustrated). The respective drive parts 130, 130 of the pantograph links 11 drive in response to them. As a result, drive forces of the drive parts 130, 130 are transmitted to the first arms 110, 110 via the shaft members 121, 121, and the first arms 110, 110 operate in a direction to stand up or operate in a direction to bend outward.

When one of the first arms 110 operates in the direction to stand up, that is, when this first arm operates in a direction in which an inside angle between this first arm 110 and the second arm 111 pivotally supported on the first arm 110 via the shaft member 122 increases, it is in a direction in which a combined height from the base end portion 110a of the first arm 110 to the opposite end portion 111b of the second arm 111 increases. Thus, the portion of the upper support frame 600 supporting the shaft member 123 on which the opposite end portion 111b of the second arm 111 which operated thus is pivotally supported relatively rises. Conversely, when one of the first arms 110 operates in the direction to bend outward, that is, when this first arm operates in a direction in which the inside angle between this first arm 110 and the second arm 111 pivotally supported on the first arm 110 via the shaft member 122 decreases, it is in a direction in which a combined height from the base end portion 110a of the first arm 110 to the opposite end portion 111b of the second arm 111 relatively decreases. Thus, the portion of the upper support frame 600 supporting the shaft member 123 on which the opposite end portion 111b of the second arm 111 which operated thus is pivotally supported relatively lowers. In this manner, by individually controlling the first arms 110, 110 and the second arms 111, 111 of each pantograph link 11 by the drive parts 130, 130, respectively, the upper support frame 600 relatively displaces with respect to the lower support frame 700. Moreover, in this embodiment, since there are three pantograph links 11 at equal intervals in the circumferential direction, they can be displaced in six-axis directions by a combination of movements of them. Thus, with respect to vibrations operating from any direction to the lower support frame 700, the upper support frame 600 can change in posture in a relatively reverse direction, and hence the posture of the seat 500 can be constantly kept in a stable posture.

Specifically, with respect to vibrations inputted from any direction, the upper support frame 600 and the seat 500 are kept in a stable posture under control by the active control mechanism 10. Accordingly, when vibrations are input from any direction, no biased movement occurs in the seat suspension 1. Thus, the Coulomb friction force is decreased, and damping by the compressed coil spring 21 and the magnetic spring 22 is performed effectively. Of course, the active control mechanism 10 also exhibits a vibration absorption characteristic by allowing the upper support frame 600 to operate in a reverse phase with respect to input vibrations as described above. However, in this embodiment, the passive damping function by the compressed coil spring 21 and the magnetic spring 22 operates, and hence the loads of the drive parts 130 which are controlled actively can be reduced, which can contribute to size reduction and cost reduction of the motors constituting the drive parts 130.

Figure 7:
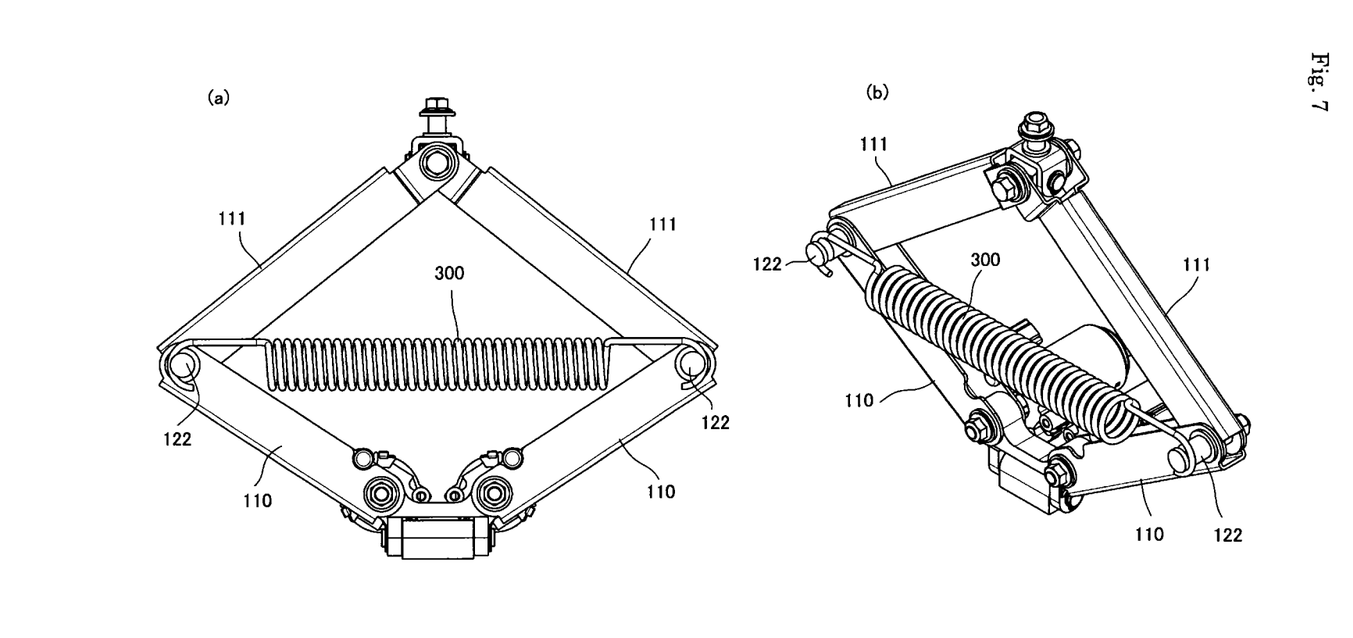
Figure 8:
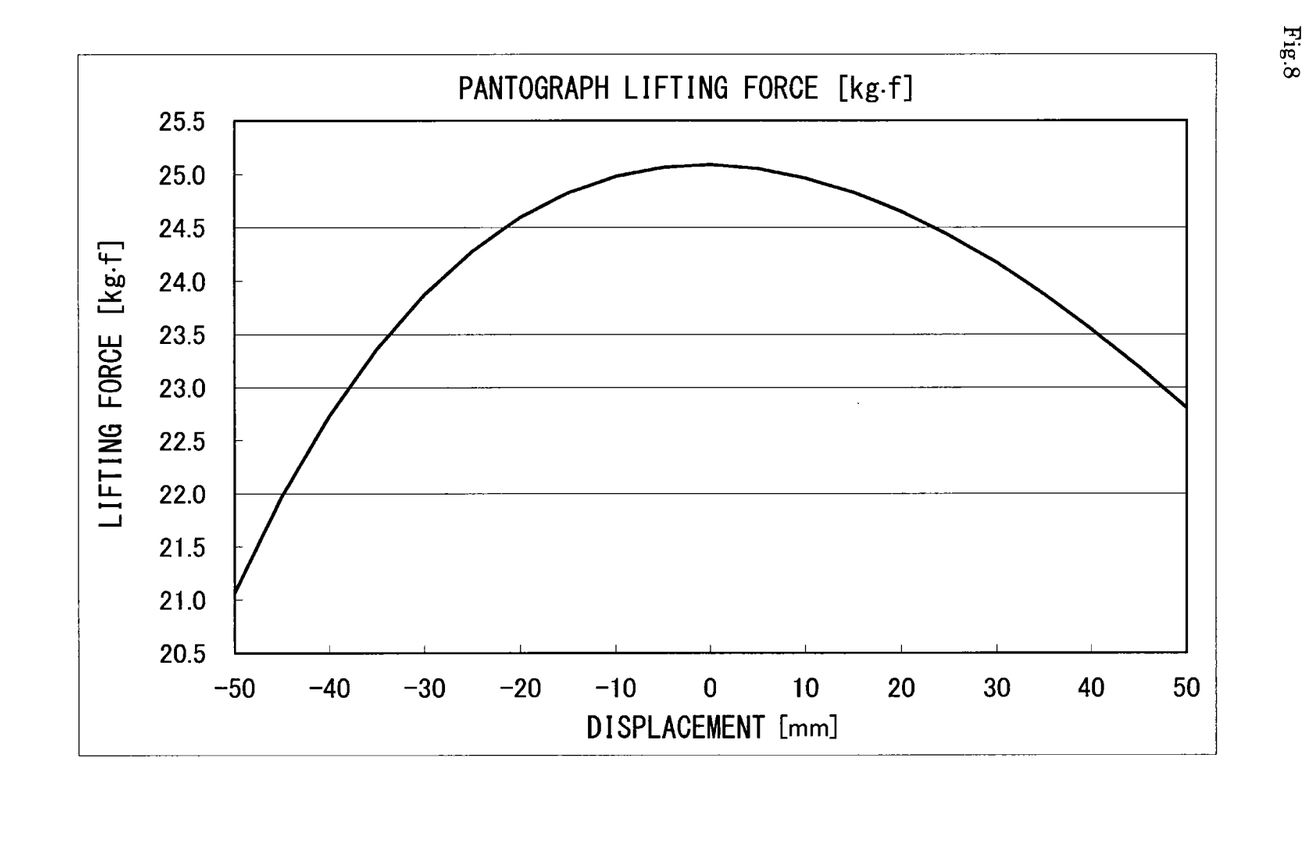
FIG. 8 is a graph illustrating the relation between a displacement and a lifting force in the structure of FIG. 7.

In FIGS. 7(*a*), (*b*), a tensile coil spring 300 is bridged across the shaft members 122, 122 between the first arms 110 and the second arms 111 of the pantograph links 11. By bridging the tensile coil spring 300 in this manner, as in a graph illustrated in FIG. 8, when the height of the pantograph links 11 is equal to or higher than a neutral point (0 mm), a lifting force operates to bias the upper support frame 600 upward by the pantograph links 11. On the other hand, when the height of the pantograph links 11 is below the neutral point (0 mm), the upward lifting force does not operate, resulting in having a negative spring constant characteristic such that the lifting force decreases according to the distance from the neutral point. This negative spring constant serves the function to form the dead zone where the spring constant superposed with the above-described compressed coil spring 21 having a positive spring constant becomes substantially zero. Thus, this tensile coil spring 300 can be used as the second elastic member instead of the magnetic spring 22. Further, when it is employed together with the magnetic spring 22, the elastic force to exhibit the negative spring constant of the magnetic spring 22 is supplemented by the tensile coil spring 300, and thus simplification of the structure of the magnetic spring 22, compactness of the permanent magnet used, and cost reduction can be achieved.

Figure 9:
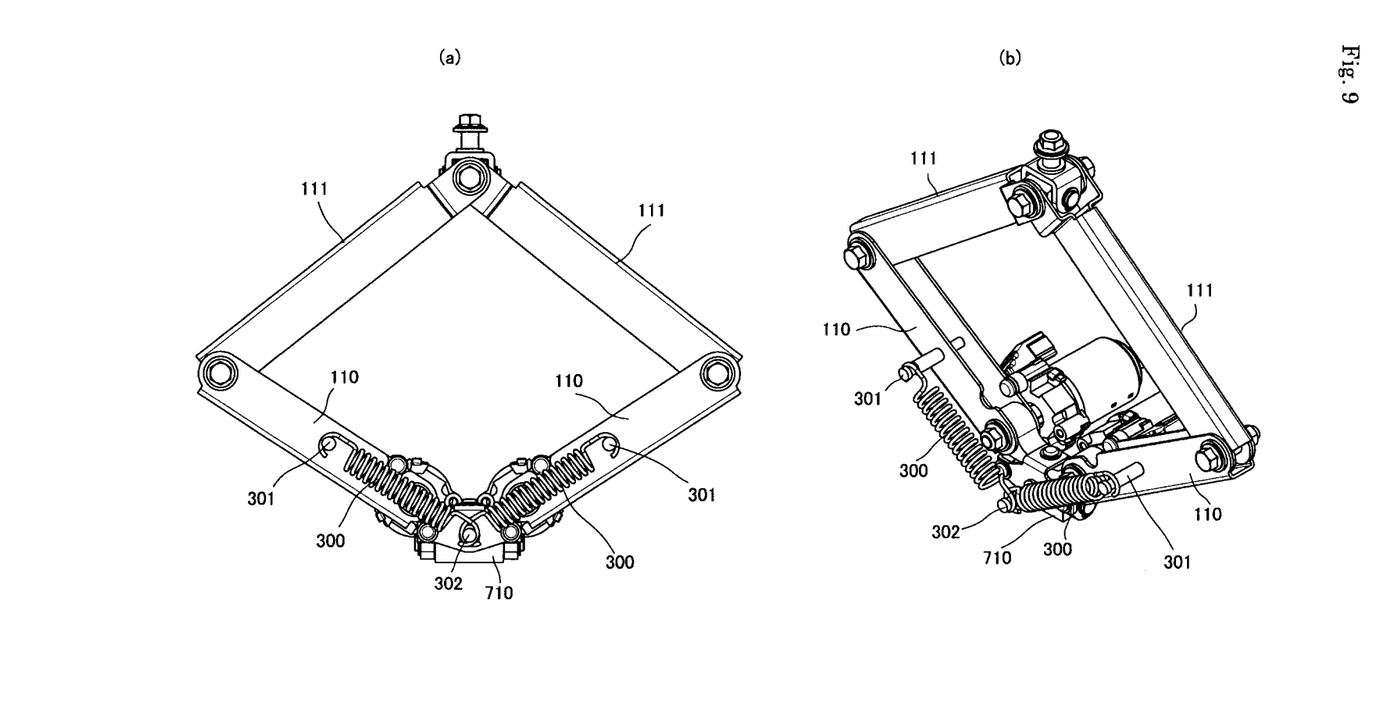

The tensile coil spring 300 exhibiting such a characteristic of a negative spring constant is not limited to ones illustrated in FIGS. 7(*a*), (*b*), as illustrated in FIGS. 9(*a*), (*b*), a structure can also be employed in which springs are bridged on a pantograph link 11 across a first-arm-side spring receiving part 301 provided in a middle portion of the first arms 110 and a vehicle body floor-side spring receiving part 302 provided in a middle portion in the width direction of the lower attachment bodies 710 of the lower support frame 700 being the vehicle body floor side.

Figure 10:
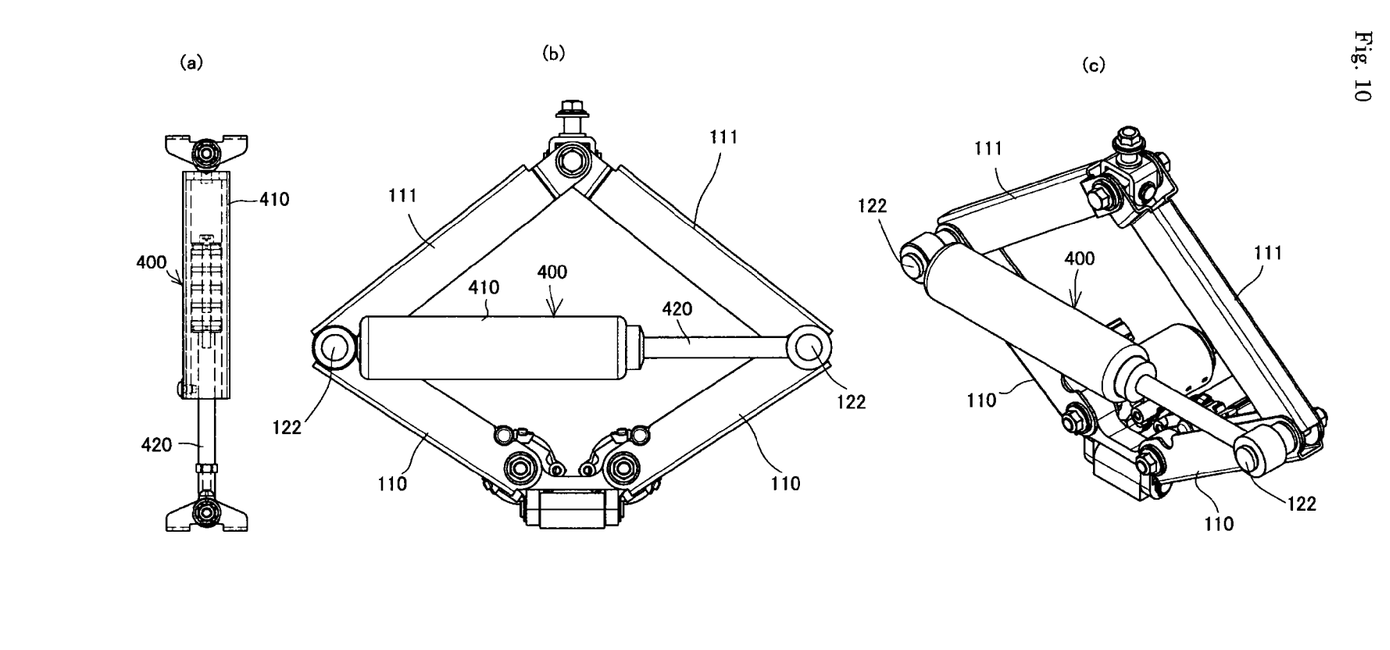
FIG. 10(a) is a view illustrating a magnetic damper.
FIGS. 10(b) and 10(c) are views illustrating an example of a structure when the damper is provided on the pantograph link.

This embodiment has the compressed coil spring 21 as the first elastic member as described above to constantly bias the upper support frame 600 upward, but the region where the negative spring constant of the magnetic spring 22 as the second elastic member functions is only the predetermined range with the equilibrium point being the center as described above. That is, it is a structure having a Duffing type spring characteristic, and thus when the spring force operates in a higher position than the equilibrium point, the positive spring constant of the compressed coil spring 21 operates. Specifically, when impact vibrations are inputted and the upper support frame 600 is displaced relatively largely, the operating point of the spring force exceeds the dead zone where the spring constant is substantially zero and becomes higher than that. Accordingly, the displacement heading upward of the upper support frame 600 increases in speed. Therefore, when an oil damper, a magnetic damper, or the like which is speed dependent is further provided in the structure of the embodiment, the damping force becomes large when the operating point of the spring supporting the upper support frame 600 is at an upper position exceeding the dead zone, and there is an advantage that the impact vibrations can be absorbed efficiently. For example, as illustrated in FIGS. 10(*a*) to 10(*c*), it can be a structure in which an end portion of the side of a cylinder 410 of a damper 400 and an end portion of the side of a piston 420 thereof are bridged across the shaft members 122, 122 between the first arms 110 and the second arms 111 of the pantograph link 11. Note that when the damper 400 is provided, the structure will not be complicated when the negative spring constant is allowed to function by the tensile coil spring 300 as illustrated in FIG. 9 without providing the magnetic spring 22.

By providing the damper 400 in this manner, in a displacement region higher than the equilibrium point in the pantograph links 11, the positive spring force of the first elastic member (compressed coil spring 21) operates more than at the equilibrium point, and thus the damping force of the damper 400 which is speed dependent highly operates as described above. At this time, the active control mechanism 10 can be controlled as necessary to adjust the damping force. Further, in a displacement region lower than the equilibrium point in the pantograph links 11, the seat suspension can be controlled to cancel the Coulomb friction force generated in the system by control of the active control mechanism 10 and the damping force of the damper 400 so that the feeling of springiness becomes relatively high. That is, the seat suspension is structured to have a dead zone by the first elastic member and the second elastic member and is set so that, above the equilibrium point, a positive spring constant operates more than at the vicinity of the equilibrium point, and the pantograph links 11 and the active control mechanism 10 are combined therewith. This enables to set a region where a damping force highly operates and a region where a spring force highly operates in one system, allowing a high vibration absorption characteristic to function.

EXPLANATION OF REFERENCE SYMBOLS 1 seat suspension
10 active control mechanism
11 pantograph link
110 first arm
111 second arm
130 drive unit
140 sensor
21 compressed coil spring (first elastic member)
22 magnetic spring (second elastic member)
221 cylinder
222 piston
300 tensile coil spring

The invention claimed is:

1. A seat suspension interposed between a vehicle body floor and a seat, wherein:
the seat suspension comprises a first elastic member having a positive spring constant is a load value increases as an increase of a displacement amount, to bias the seat side in a direction to depart from the vehicle body floor side and a second elastic member with a negative spring constant is a load value decreases relative to an increase of a displacement amount, functioning in a predetermined displacement range, the first and second elastic members being structured to form a dead zone where superposed spring constants of the first and second elastic members become substantially zero in the predetermined displacement range, and to damp input vibrations by operation of the dead zone; and
the seat suspension has an active control mechanism comprising three disposed pantograph links and controlling the pantograph links corresponding to input vibrations from the vehicle body floor, and displacing the seat side in six-axis directions.

2. The seat suspension according to claim 1, wherein the second elastic member is a magnetic spring having a negative spring constant functioning in a predetermined displacement range.

3. The seat suspension according to claim 1, wherein the pantograph links are provided with an elastic member having a negative spring constant functioning in a predetermined displacement range.

4. The seat suspension according to claim 1, wherein the first elastic member is a compressed coil spring biasing the seat side in a direction to depart from the vehicle body floor side.

5. The seat suspension according to claim 1, further comprising a damper,
wherein in a displacement region higher than an equilibrium point in the pantograph links, the seat suspension is controlled to increase a damping force of the damper by using a spring force of the first elastic member, and
wherein in a displacement region lower than the equilibrium point in the pantograph links, the seat suspension is set to cancel a Coulomb friction force generated in a system by control of the active control mechanism and a damping force of the damper so that a feeling of springiness becomes relatively high.

6. The seat suspension according to claim 1, wherein the three pantograph links are disposed at equal intervals in a circumferential direction in plan view.

* * * * *